US009751699B2

(12) United States Patent
Papsdorf et al.

(10) Patent No.: US 9,751,699 B2
(45) Date of Patent: Sep. 5, 2017

(54) ARTICLE FEED SYSTEM FOR ALIGNING AND SINGULATING ARTICLES

(71) Applicant: The Procter & Gamble Company, Cincinnati, OH (US)

(72) Inventors: Clifford Theodore Papsdorf, Miami Township, OH (US); Michael John Mers-Kelly, Hartford, ME (US); Christopher Michael Richards, Poland, ME (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/369,251

(22) Filed: Dec. 5, 2016

(65) Prior Publication Data
US 2017/0088364 A1 Mar. 30, 2017

Related U.S. Application Data

(63) Continuation of application No. 13/047,418, filed on Mar. 14, 2011, now Pat. No. 9,511,950.

(51) Int. Cl.
*B65G 47/14* (2006.01)
(52) U.S. Cl.
CPC ..... *B65G 47/1435* (2013.01); *B65G 47/1414* (2013.01); *B65G 47/1428* (2013.01); *B65G 47/1442* (2013.01); *B65G 47/1457* (2013.01); *B65G 47/1464* (2013.01); *B65G 47/1485* (2013.01)

(58) Field of Classification Search
CPC ............ B65G 47/1435; B65G 47/1485; B65G 47/1414; B65G 47/1428; B65G 47/1442; B65G 47/1457; B65G 47/1464
See application file for complete search history.

(56) References Cited

U.S. PATENT DOCUMENTS

| | | | | |
|---|---|---|---|---|
| 4,429,808 A | * | 2/1984 | Doty | B65G 47/1457 198/392 |
| 4,560,060 A | * | 12/1985 | Lenhart | F02P 9/007 198/453 |
| 4,878,575 A | | 11/1989 | McDonald | |
| 4,995,503 A | * | 2/1991 | Graham | B67B 3/06 198/392 |
| 5,044,487 A | * | 9/1991 | Spatafora | B65G 47/1457 198/392 |

(Continued)

OTHER PUBLICATIONS

PCT International Search Report dated May 22, 2012, 4 pages.

*Primary Examiner* — Thomas Randazzo
(74) *Attorney, Agent, or Firm* — Dara M. Kendall

(57) ABSTRACT

An article feed system for aligning and singulating incoming articles includes a rotatable upper rim surface and an article delivery device that delivers articles received by the article delivery device to the upper rim surface. A drive system is operatively connected to the outer bowl that rotates the outer bowl. A guide wall extends upwardly above the upper rim surface that guides the articles travelling along the upper rim surface toward an exit opening in the guide wall. A vertically oriented article engaging-type conveyor is at the exit opening in the guide wall. The vertically oriented article engaging-type conveyor includes a moving article engaging surface that is exposed to the exit opening in the guide wall for receiving the articles when they exit the exit opening.

10 Claims, 6 Drawing Sheets

(56) References Cited

U.S. PATENT DOCUMENTS

| | | | | |
|---|---|---|---|---|
| 5,145,051 A | * | 9/1992 | Hoppmann | B65G 47/1457 198/392 |
| 5,170,879 A | | 12/1992 | Smith | |
| 5,197,584 A | | 3/1993 | Powell | |
| 5,348,133 A | * | 9/1994 | Powell | B65G 47/256 198/380 |
| 5,544,732 A | * | 8/1996 | Schmitt | B65G 47/1464 198/392 |
| 5,740,899 A | * | 4/1998 | Pugh | B65G 47/1457 198/392 |
| 6,578,699 B2 | * | 6/2003 | Baird | B65G 47/1457 198/392 |
| 6,886,683 B1 | * | 5/2005 | Kakiuchi | B65G 47/1485 198/393 |
| 7,383,937 B2 | * | 6/2008 | Perreault | B65G 47/1464 198/392 |
| 7,472,782 B2 | * | 1/2009 | Corbin | B65G 47/1457 198/392 |

\* cited by examiner

US 9,751,699 B2

ARTICLE FEED SYSTEM FOR ALIGNING AND SINGULATING ARTICLES

TECHNICAL FIELD

The present invention is generally directed to article feed systems for aligning and singulating articles.

BACKGROUND

Various systems have been developed to orient and singulate articles to facilitate automated feed into associated processing equipment. As on example, a rotary feeder may be used to singulate and orientate the articles as they are supplied to associated equipment, with the articles arranged into a sequential stream. This type of technology is typically employed where relatively high throughput is required. Conventional rotary feeders are disclosed in U.S. Pat. Nos. 7,472,782, 6,578,699, 5,145,051 and 4,429,808.

SUMMARY

In one embodiment, an article feed system for aligning and singulating incoming articles includes a rotatable upper rim surface and an article delivery device that delivers articles received by the article delivery device to the upper rim surface. A drive system is operatively connected to the outer bowl that rotates the outer bowl. A guide wall extends upwardly above the upper rim surface that guides the articles travelling along the upper rim surface toward an exit opening in the guide wall. A vertically oriented article engaging-type conveyor is at the exit opening in the guide wall. The vertically oriented article engaging-type conveyor includes a moving article engaging surface that is exposed to the exit opening in the guide wall for receiving the articles when they exit the exit opening.

In another embodiment, a centrifugal article feed system for orienting and aligning incoming articles includes an outer bowl having an upper rim surface. An inner disk is disposed within the outer bowl and extends at an incline from a lower portion of the outer bowl upwardly adjacent the upper rim surface for delivering articles from the lower portion of the outer bowl upwardly to the upper rim surface. A drive system is operatively connected to the outer bowl and the inner disk that rotates the outer bowl and the inner disk. A guide wall extends upwardly above the upper rim surface that guides the articles travelling along the upper rim surface toward an end of the guide wall. A distance between the guide wall and an inner edge of the upper rim surface is substantially constant over an article guide distance along which the articles travel on the upper rim surface. The distance between the guide wall and the inner edge of the upper rim surface is no greater than about 150 percent of a width of the article.

In another embodiment, a method of aligning and orienting articles using a centrifugal article feed system comprising an outer bowl having an upper rim surface and an inner disk disposed within the outer bowl and extending at an incline from a lower portion of the outer bowl upwardly toward the upper rim surface. The method includes rotating the outer bowl and the inner disk disposed within the outer bowl. Articles fed to the article feed system are moved along the inner disk from the lower portion of the outer bowl upwardly to the upper rim surface. The articles are transferred from the inner disk to the upper rim surface. The articles are guided as the articles travel with the upper rim surface using a guide wall that extends upwardly above the upper rim surface. The articles are transferred from the upper rim surface through an exit opening in the guide wall to a vertically oriented vacuum conveyor providing a conveyor transfer path that is substantially tangential to a periphery of the outer bowl at the upper rim surface.

BRIEF DESCRIPTION OF THE DRAWINGS

The following detailed description of specific embodiments of the present invention can be best understood when read in conjunction with the drawings enclosed herewith.

Figure 1:
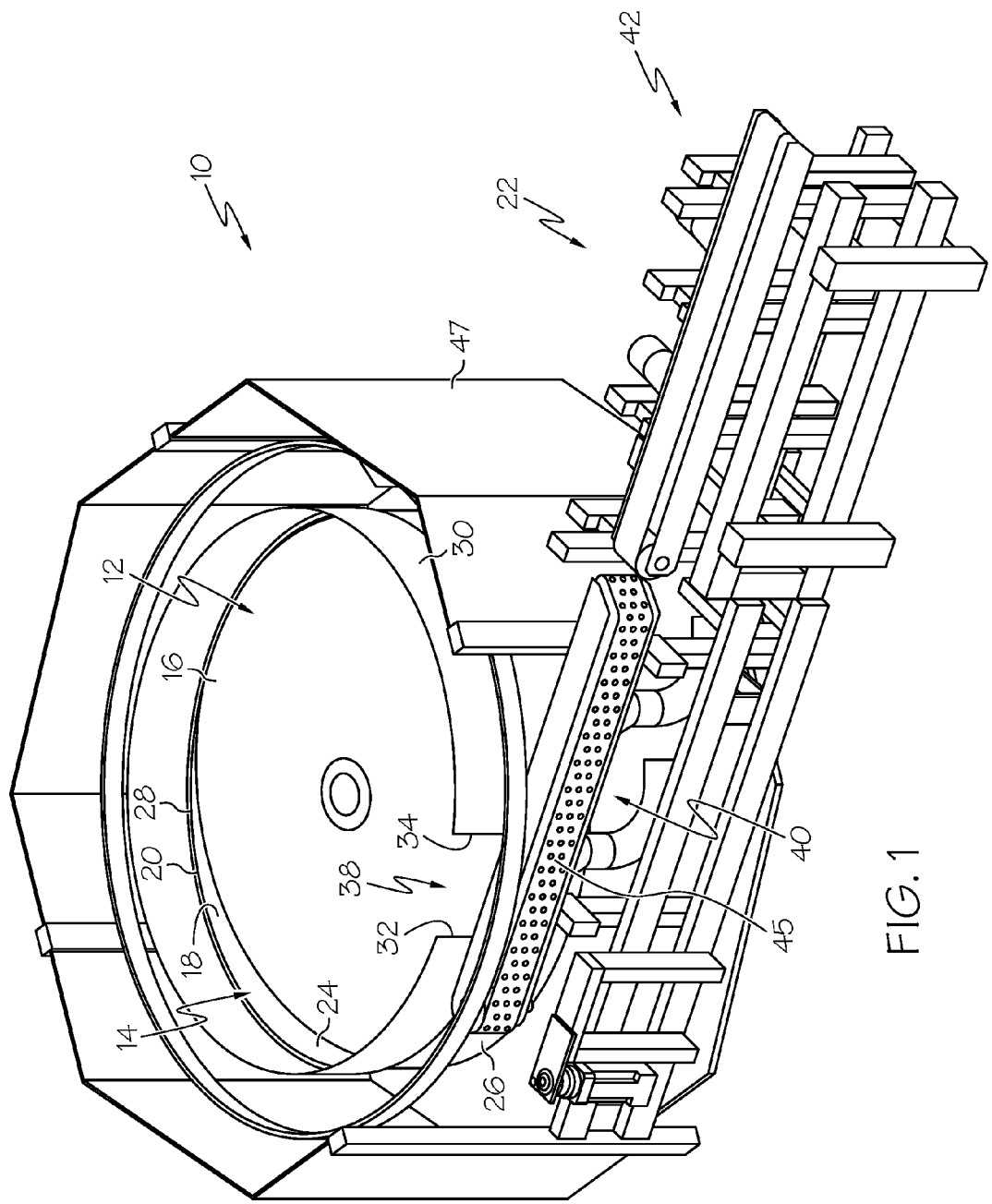
FIG. 1 is a perspective view of an embodiment of a centrifugal article feed system.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

The following text sets forth a broad description of numerous different embodiments of the present invention. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

It should also be understood that, unless a term is expressly defined in this specification using the sentence "As used herein, the term '____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential to the present invention unless so stated. To the extent that any term recited in the claims at the end of this patent is referred to in this patent in a manner consistent with a single meaning, that is done for sake of clarity only so as to not confuse the reader, and it is not intended that such a claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Embodiments described herein generally relate to centrifugal article feed systems for aligning and singulating articles. These centrifugal article feed systems may include apparatus known as bowl sorter assemblies. Such bowl sorter assemblies may include a rotatable disk assembly and a rotatable bowl assembly. The rotatable disk assembly is used to deliver articles outwardly to the rotatable bowl assembly. The articles are then transported by the rotatable bowl assembly to a discharge conveyor in an aligned, singulated fashion.

The systems and methods described herein may be useful in handling mass quantities of a number of articles, particularly relatively lightweight articles of less than about 1000 grams, such as absorbent articles that include a wrapper, such as wrapped tampons having a wrapper material for feminine hygiene. Often times, lightweight articles, such as wrapped tampons, may be somewhat easily damaged during mass product handling. Damage can be to the tampon itself and/or to the wrapper.

By "tampon" it is meant herein an absorbent article, in some embodiments, a disposable one, comprising absorbent material usually being compressed into a self-sustaining, generally oblong, typically essentially cylindrical shape. In most cases the absorbent material comprises fibrous material, e.g. rayon, wood pulp fluff, cotton, synthetic fibers and/or the like.

By "length" of a tampon it is meant herein the linear extension of a tampon along its largest dimension.

By "width" of a tampon it is meant the maximum width of a tampon in the widthwise direction perpendicular to the length.

"Wrapper" as used herein refers to a structure, which is formed of a wrapper material and which substantially encloses an individual absorbent article, in some embodiments, an individual tampon, for packaging purposes. The wrapper may be constituted of one connected piece of wrapper material, though a wrapper can also be made from multiple pieces of material sufficiently joined together such that it substantially acts as one connected piece of wrapper material.

By "wrapper material" it is meant herein any material suitable to be used for hygienically wrapping tampons. Various wrappers and wrapper materials are described in, for example, U.S. Pat. No. 6,955,665.

Figure 2:
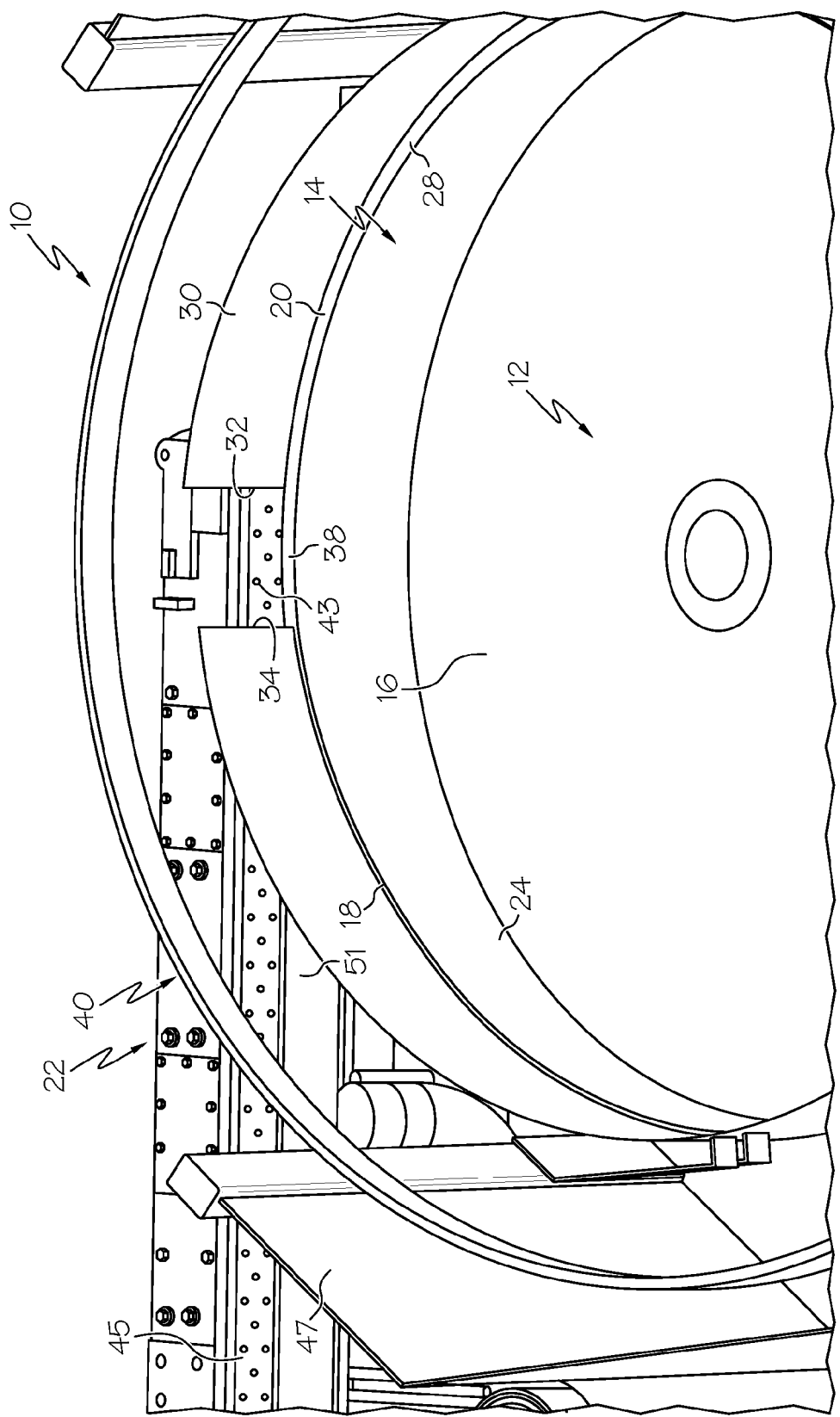
FIG. 2 is another perspective view of the centrifugal article feed system of FIG. 1.

Referring to FIGS. 1 and 2, a centrifugal article feed system 10 for use in aligning and singulating articles includes a bowl sorter assembly that includes a rotatable disk assembly 12 and a rotatable bowl assembly 14. The rotatable disk assembly 12 includes an article delivery device, in this embodiment, a rotatable inner disk 16 disposed within an outer bowl 18 of the rotatable bowl assembly 14. The inner disk 16 may be disposed at an incline extending from a lower portion of the outer bowl 18 upwardly toward an upper rim surface 20 of the outer bowl 18. In some embodiments, the amount of incline of the inner disk 16 may be adjustable. The inner disk 16 can deliver articles from the lower portion of the outer bowl 18 upwardly to the upper rim surface 20 for delivery to a discharge conveyor assembly 22, as will be described in greater detail below.

The rotatable bowl assembly 14 includes the outer bowl 18 having an interior surface 24, an exterior surface 26 and an upper rim 28 that extends about a periphery of the outer bowl 18. A guide wall 30 coextends with the upper rim surface 20. The guide wall 30 includes a terminating edge 32 and a beginning edge 34. The terminating edge 32 and the beginning edge 34 are spaced apart to form an exit opening 38 through which articles may exit and be delivered to the discharge conveyor assembly 22. In some embodiments, an outer guard wall 47 may extend about the rotatable bowl assembly 14.

The discharge conveyor assembly 22 includes a discharge conveyor 40 and a product conveyor 42 (FIG. 1). In some embodiments, the discharge conveyor 40 may be a vertically oriented conveyor. By vertically oriented, it is meant that the conveying surface provided by the discharge conveyor 40 is substantially at an angle (e.g., 90 degrees) to a horizontal plane. The vertical conveyor does not need to be exactly vertical and would still provide benefit at other angles such as 15 degrees from the vertical plane. In some embodiments, the discharge conveyor 40 may be a vertically oriented vacuum conveyor. Negative pressure supplied at the conveying surface through openings 43 of a conveyor belt 45 of the discharge conveyor 40 draws the articles to the conveying surface providing an article engaging surface that is exposed to the exit opening 38 in the guide wall 30 for receiving the articles when they exit the exit opening 38. The articles are adhered by vacuum to the conveying surface which prevents the articles from falling off of the vertical conveyor surface due to gravity. Alternative embodiments of the vertical conveyor 40 can maintain control of the articles and overcome gravitational acceleration. A mechanical gripper may be employed to maintain control of the articles. Frictional force between the article and conveyor belt can also be generated to maintain control of the articles by magnetic, electrostatic, or adhesive forces. If the article is traveling at a high rate of speed, the centrifugal acceleration acting on the article just before the article transitions to the conveyor 40 can generate sufficient frictional force to keep the article under control on the vertical conveyor 40 due to the inertia of the article.

In some embodiments, the article will transition from the vertical conveyor 40 to a product conveyor 42. The product conveyor 42 may be horizontally oriented or could be an additional vertical conveyor. The product conveyor 42 may be a vacuum conveyor or any other suitable conveyor type. In some embodiments, the product conveyor 42 is not used and articles may be delivered directly from vertical conveyor 40 to the downstream process.

The discharge conveyor 40 and the product conveyor 42 may each be driven to control the speed of transported article. These conveyors 40 and 42 can be driven at the same speed as the speed of the article discharging the sorting bowl or can be driven at different speeds. If for example, the speed of the discharge conveyor 40 is greater than the discharge speed of the article exiting the sorting bowl, the relative spacing between sequential articles is increased. This can be useful for singulating the articles. If the speed of the product conveyor 42 is greater than discharge conveyor 40, this will also increase the relative spacing between sequential articles. In some embodiments, guide rails 51 may be used to control the position of the articles as they are carried by the discharge and/or product conveyors 40 and 42.

Figure 3:
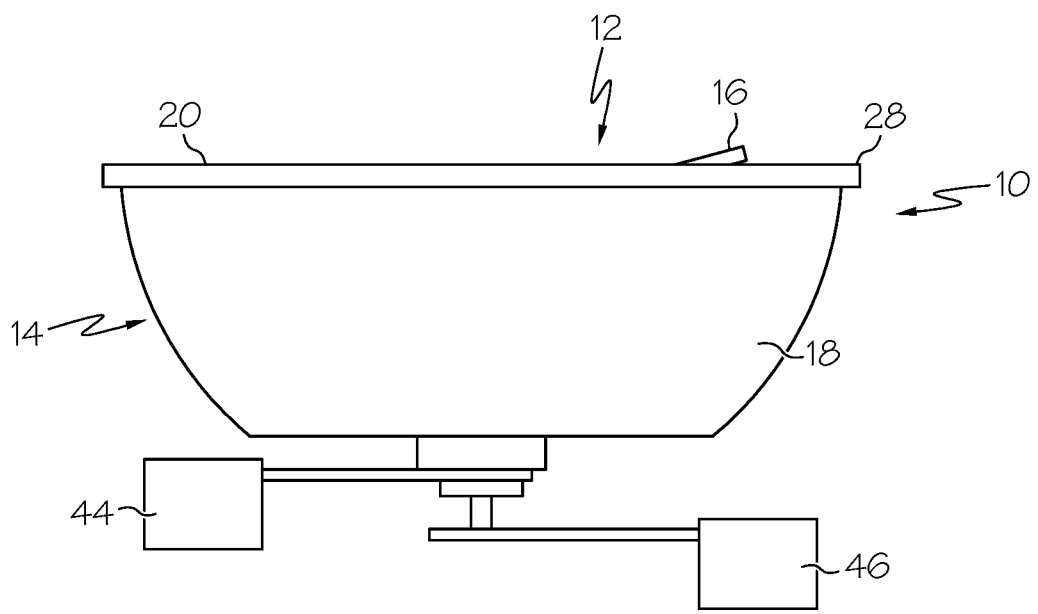
FIG. 3 is a diagrammatic side view of the centrifugal article feed system of FIG. 1 illustrating an exemplary drive system.

Referring to FIG. 3, a diagrammatic driving system arrangement for the centrifugal article feed system 10 is illustrated. In this embodiment, the rotatable disk assembly 12 and the rotatable bowl assembly 14 are each driven by separate motors 44 and 46, respectively. In another embodiment, a single motor (or other suitable drive mechanism) may be used to rotate both the rotatable disk assembly 12 and the rotatable bowl assembly 14. The rotatable disk assembly 12 and the rotatable bowl assembly 14 may rotate the same direction and at the same or different speeds during operation. In some instances, the rotatable disk assembly 12 rotates faster than the rotatable bowl assembly 14 for delivering the articles upwardly toward the upper rim surface 20. In one configuration, the rotatable disk assembly 12 rotates at a slower rotational speed than the rotatable bowl assembly 14 to create some space between articles supplied to upper rim surface 20.

Figure 4:
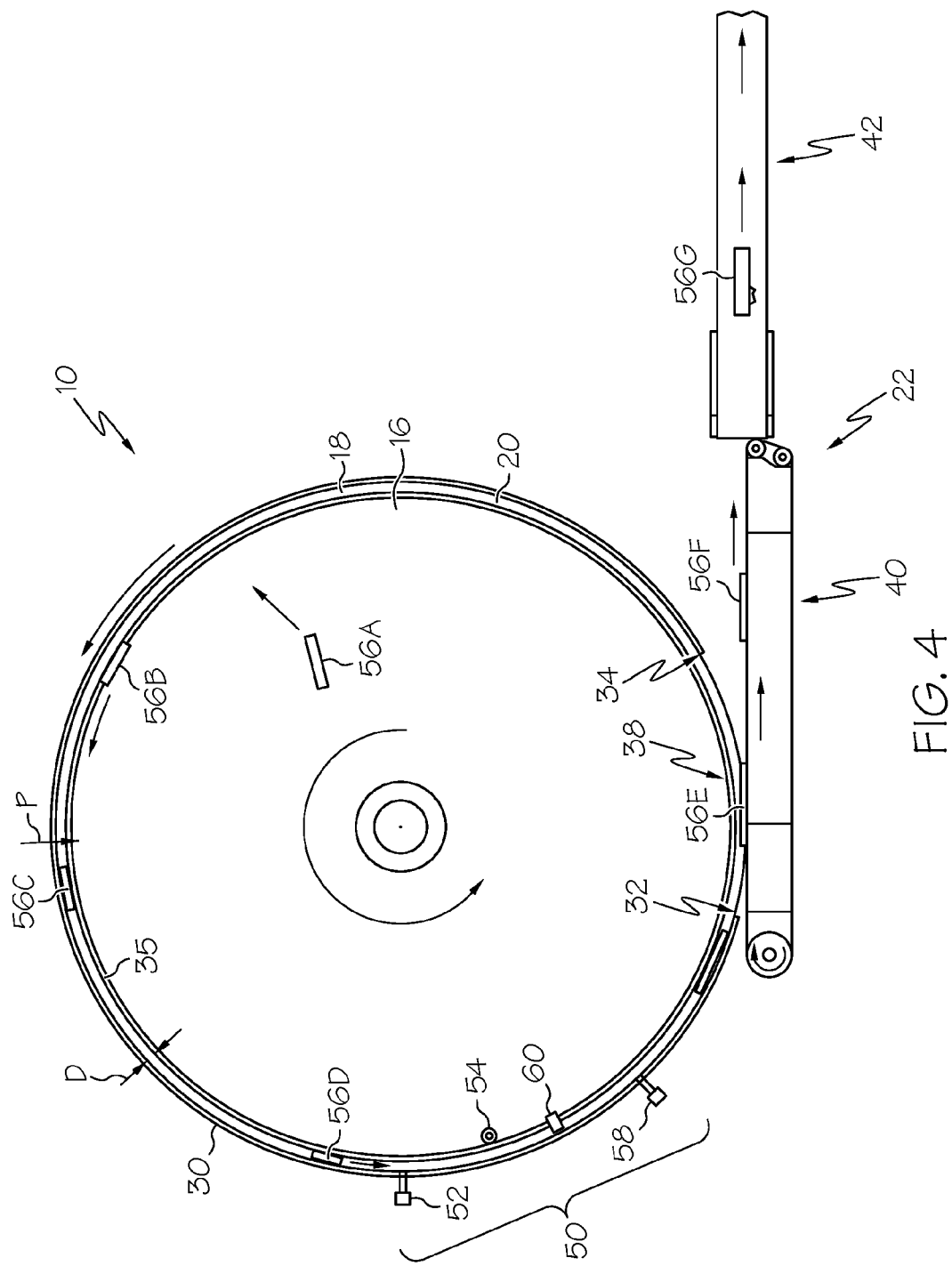
FIG. 4 is a diagrammatic top view of the centrifugal article feed system of FIG. 1.
Figure 5:
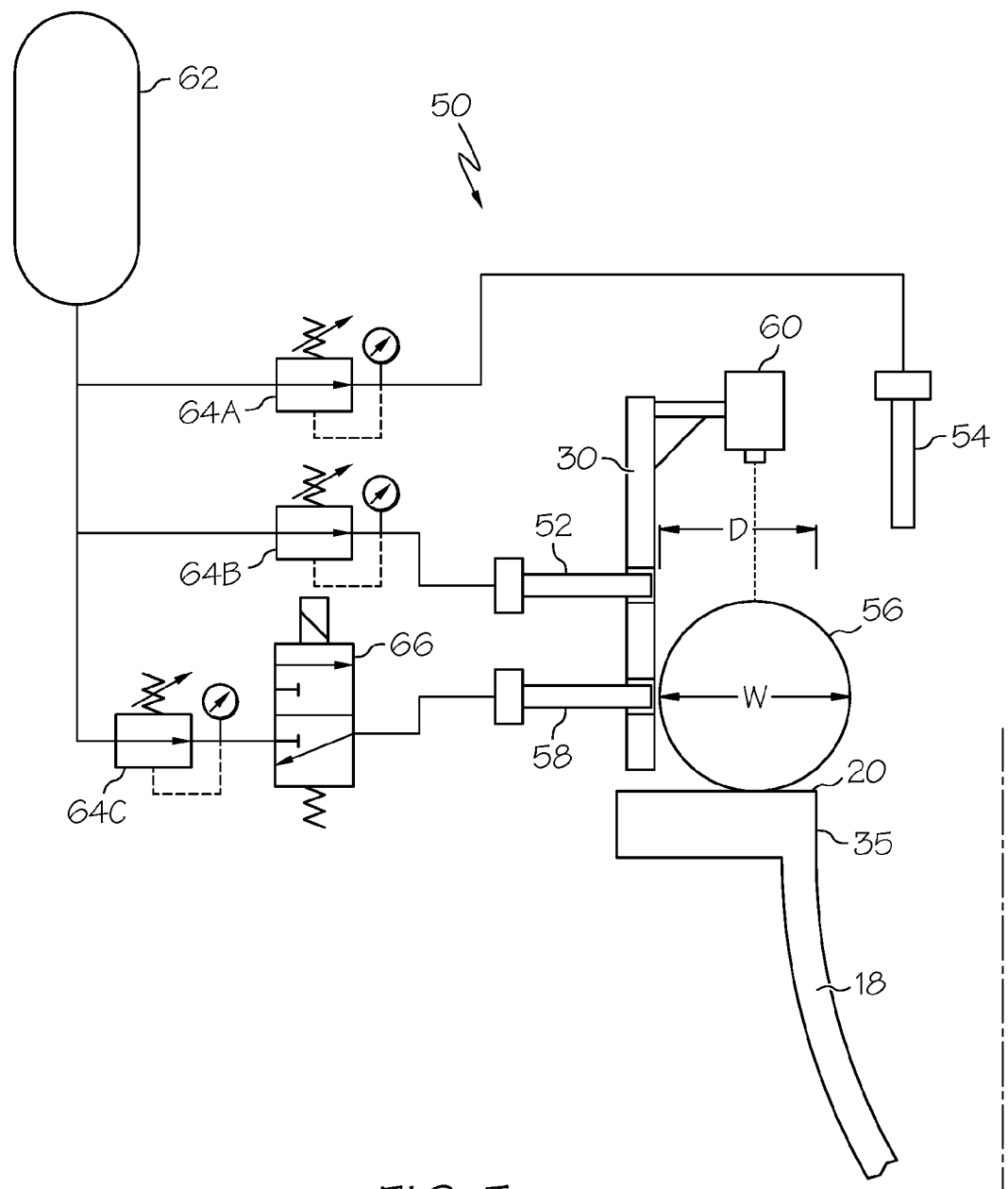
FIG. 5 illustrates an exemplary article control system for use with the centrifugal article feed system of FIG. 1.

Referring to FIG. 4, a top view of the centrifugal article feed system 10 including the upper rim surface 20 is illustrated. As can be seen, the guide wall 30 extends about a periphery of the outer bowl 18. The guide wall 30 includes the terminating edge 32 and the beginning edge 34 that is spaced from the terminating edge 32 to provide the exit opening 38 through which articles may exit and be delivered to the discharge conveyor assembly 22. The guide wall 30 is spaced radially a distance D from an interior edge 35 of the upper rim surface 20. In some embodiments, the distance D is substantially the same along the entire length of the guide wall 30. In some embodiments, the distance D is substantially the same for an entire article guide distance, which may be defined as the distance from an imaginary starting line including the highest point P of the inner disk 16 to the exit opening 38 along which the articles travel along the upper rim surface 20. In some embodiments, the distance D may be selected to have a relationship with a width W of the article (FIG. 5). For some articles, the distance D may be set to less than the width of the article, such as about 75 percent of W. One exemplary range for D is between about 50 and about 150 percent of maximum width of article W. By correlating the width or the article and the distance D, it may be less likely that articles will travel side-by-side on the upper rim surface 20 during operation and can make it easier to provide a single file stream of product.

Exemplary articles 56A-56G depict the articles in various positions along the feed system. The articles 56A-56G are automatically and/or manually introduced onto the rotatable inner disk 16. Article 56A depicts a typical position for an article recently introduced to the feed system. The article 56A is driven by friction with disk 16 and rotates following an arcuate path. The centrifugal acceleration of the rotating article 56A causes the article 56A to move radially outward toward the rotatable bowl assembly 14. The article 56B has come in contact with the inside wall of outer bowl 18 which aligns the product longitudinally with the inside tangent surface of the inside wall of outer bowl 18. Article 56C has moved onto the upper rim surface 20 and is driven in an arcuate path by friction with the upper rim surface 20 and slides past stationary guide wall 30. The article 56D continues to travel along the arcuate path defined by guide wall 30 and is driven by friction with upper rim surface 20. A plurality of air nozzles 52, 54, and 58 can be used to singulate the article as it travels through the article control system 50. Article 56E is transitioning from the upper rim surface 20 to the vertical discharge conveyor 40 as it exits the terminating edge 32 of guide wall 30. Article 56F is conveyed in a straight line by vertical discharge conveyor 40. Article 56G is conveyed by horizontal product conveyor 42.

Referring to FIGS. 4 and 5, an article control system 50 may include a number of air nozzles 52, 54, and 58 that are strategically placed to create a single file stream of articles 56. A plurality of nozzles 52 may blow a stream of air through holes in the guide wall 30 directed toward the axis of rotation of the outer bowl 18. The nozzles 52 may be installed above the path of a single article 56 to blow off other articles that are vertically stacked on top of each other. The nozzles 52 may be adjusted to a vertical elevation greater than W above the upper rim surface 20. The nozzles 54 direct an air stream in a downward direction just inside of the upper rim surface 20. The nozzles 54 can eliminate adjacent side by side articles 56 that are traveling together on top of rim surface 20. The nozzles 58 can direct a targeted pulsed air stream directly at an article 56 to systematically eliminate articles. The nozzles 58 work in conjunction with sensors 60 which detect the relative position of sequential articles and can signal when nozzles 58 should remove an unwanted article for instance when articles are too close together in sequence. Air pulses for the nozzles 58 may be controlled by an electrical signal to a solenoid valve 66. A PLC or industrial computer can interpret signals from sensors 60 to command when an air pulse is needed. Compressed air is supplied by reservoir 62 and pressure to nozzles 52, 54, and 58 is adjustable by pressure regulators 64A, 64B, and 64C. Locations for control system 50; nozzles 52, 54, and 58; and sensors 60 shown in FIG. 4 are exemplary and other configurations are possible.

It is also possible for the feeding system to align and singulate articles with none or some of the article control system 50 in use. Articles traveling through the feeding system may be naturally singulated by the narrow ledge created by guide wall 30 and upper rim surface 20 and tangential transfer to vertical conveyor 40. Mechanical means such as plows, guides, fingers, and driven ejection pins and diverter gates can also be employed.

Figure 6:
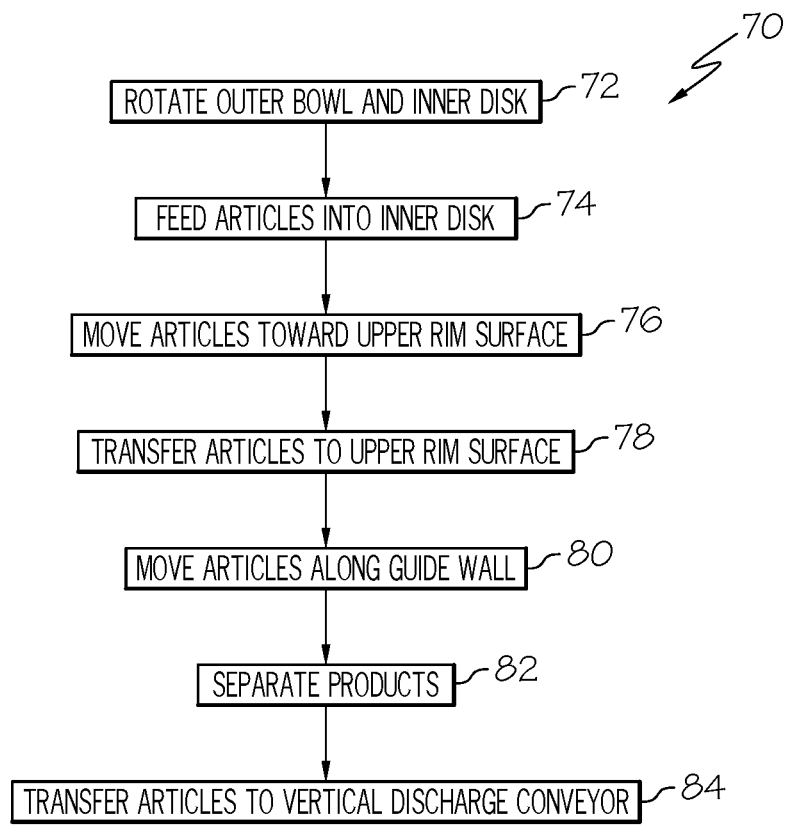
FIG. 6 illustrates an exemplary method of aligning and orienting articles using the centrifugal article feed system of FIG. 1.

Referring to FIG. 6, an exemplary method 70 of aligning and singulating articles using the centrifugal article feed system 10 is illustrated. At step 72, the outer bowl 18 and the inner disk 16 are rotated using one or both of the motors 44 and 46. In some embodiments, the outer bowl 18 and the inner disk 16 are rotated at substantially the same speed. Alternatively, the outer bowl 18 and the inner disk 16 may be rotated at different speeds (e.g., the outer bowl may rotate faster or slower than the inner disk). At step 74, multiple articles 56 (e.g., wrapped tampons) are fed onto the inner disk 16. Centrifugal acceleration acts on the articles 56 to accelerate them radially outward along inner disk 16 toward the outer bowl assembly 18. The articles 56 travel with the inner disk 16 and move along the inner disk from a lower portion of the outer bowl 18 upwardly to the upper rim surface 20 at step 76. Due to the motion imparted on the articles 56, the articles 56 transfer from the inner disk 16 to the upper rim surface 20 at step 78. At step 80, the articles 56 are guided along the guide wall 30 as the articles 56 travel with the upper rim surface 20. In some embodiments, air jets may be directed downwardly onto the articles 56 traveling on the upper rim surface 20 control position of the articles 56 on the upper rim surface 20 of to remove articles from the upper rim surface 20. At step 82, articles 56 are conditioned to singulate products and create a single file stream. This conditioning can be due to the natural movement of articles 56 through the feeder system or in some embodiments the article control system 50 employing the air nozzles 52, 54, and 58 or other mechanical means can be used to adjust article positions and remove articles 56 not in single file. At step 84, the articles 56 are transferred from the upper rim surface 20 through the exit opening 38 in the guide wall 30 to the vertically oriented discharge conveyor 40 providing a conveyor transfer path that is substantially tangential to the periphery of the outer bowl 18 at the upper rim surface 20. The articles 56 may then be transported, e.g., in single file fashion to a downstream packaging operation.

The above-described centrifugal article feed systems for aligning and singulating articles in the form of bowl sorters may improve quality by creating more consistent article spacing and alignment. For example, the articles may be wrapped tampon products that are aligned in a single file generally in the length direction of the wrapped tampons. The articles may transfer more reliably from the upper rim surface to a vertically oriented vacuum conveyor. This can reduce damage that can occur when an article such as a wrapped tampon article is pulled across the transfer to a conventional horizontally oriented discharge conveyor. This configuration also produces and maintains more consistent spacing between products which can be beneficial to downstream packing equipment. This configuration can also eliminate overlapping adjacent articles that can create jams and miscounts in downstream equipment.

It is noted that terms like "preferably," "generally," "commonly," and "typically" are not utilized herein to limit the scope of the claimed embodiments or to imply that certain features are critical, essential, or even important to the structures or functions. Rather, these terms are merely intended to highlight alternative or additional features that may or may not be utilized in a particular embodiment.

For the purposes of describing and defining the various embodiments it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

All documents cited in the Detailed Description are, in relevant part, incorporated herein by reference; the citation of any document is not to be construed as an admission that it is prior art. To the extent that any meaning or definition of a term in this written document conflicts with any meaning or definition of the term in a document incorporated by reference, the meaning or definition assigned to the term in this written document shall govern.

While particular embodiments have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An article feed system for aligning and singulating incoming articles, the article feed system comprising:
    a rotatable upper rim surface;
    an article delivery device that delivers articles received by the article delivery device to the upper rim surface;
    a drive system operatively connected to the outer bowl that rotates the outer bowl;
    a guide wall extending upwardly above the upper rim surface that guides the articles travelling along the upper rim surface toward an exit opening in the guide wall; and
    a vertically oriented article engaging-type conveyor at the exit opening in the guide wall, the vertically oriented article engaging-type conveyor including a moving article engaging surface that is exposed to the exit opening in the guide wall for receiving the articles when they exit the exit opening.

2. The article feed system of claim 1, wherein the article delivery device comprises an inner disk disposed within the outer bowl and extending at an incline from a lower portion of the outer bowl upwardly toward the upper rim surface for delivering articles from the lower portion of the outer bowl upwardly to the upper rim surface, the drive system operatively connected to the inner disk that rotates the inner disk.

3. The article feed system of claim 1, wherein the vertically oriented article engaging-type conveyor provides a conveyor transfer path that is substantially tangential to a periphery of the outer bowl at the upper rim surface.

4. The article feed system of claim 1 further comprising an article control system comprising a plurality of air nozzles arranged and configured to deliver pulses of air to create a single file stream of articles by removing excess articles from the upper rim surface.

5. The article feed system of claim 1, wherein the vertically oriented article engaging-type conveyor is a vacuum conveyor that comprises a vertically oriented belt including a series of openings through which air is drawn through the belt.

6. The article feed system of claim 1 further comprising a horizontal product conveyor that receives articles from the vacuum conveyor.

7. The article feed system of claim 1, wherein a distance between the guide wall and an inner edge of the upper rim surface is substantially constant over an article guide distance along which the articles travel on the upper rim surface.

8. A centrifugal article feed system for orienting and aligning incoming articles, the centrifugal article feed system comprising:
    an outer bowl having an upper rim surface;
    an inner disk disposed within the outer bowl and extending at an incline from a lower portion of the outer bowl upwardly adjacent the upper rim surface for delivering articles from the lower portion of the outer bowl upwardly to the upper rim surface;
    a drive system operatively connected to the outer bowl and the inner disk that rotates the outer bowl and the inner disk;
    a guide wall extending upwardly above the upper rim surface that guides the articles travelling along the upper rim surface toward an end of the guide wall; and
    a vertically oriented article engaging-type conveyor including a moving article engaging surface that receives the articles as the articles pass the end of the guide wall;
    wherein a distance between the guide wall and an inner edge of the upper rim surface is substantially constant over an article guide distance along which the articles travel on the upper rim surface;
    wherein the distance between the guide wall and the inner edge of the upper rim surface is no greater than about 150 percent of a width of the article.

9. A method of aligning and orienting articles using a centrifugal article feed system comprising an outer bowl having an upper rim surface and an inner disk disposed within the outer bowl and extending at an incline from a lower portion of the outer bowl upwardly adjacent the upper rim surface, the method comprising:
    rotating the outer bowl and the inner disk disposed within the outer bowl;
    moving articles fed to the article feed system along the inner disk from the lower portion of the outer bowl upwardly to the upper rim surface;
    transferring the articles from the inner disk to the upper rim surface;

guiding the articles as the articles travel with the upper rim surface using a guide wall that extends upwardly above the upper rim surface; and directly transferring the articles from the upper rim surface through an exit opening in the guide wall to a vertically oriented vacuum conveyor belt providing a transfer path that is substantially tangential to a periphery of the outer bowl at the upper rim surface;

wherein a distance between the guide wall and an inner edge of the upper rim surface is substantially constant over an article guide distance along which the articles travel along the upper rim surface.

10. The method of claim 9, wherein the distance between the guide wall and the inner edge of the upper rim surface is no greater than about 150 percent of a width of the article.

* * * * *